US011494779B1

(12) United States Patent
Gee et al.

(10) Patent No.: US 11,494,779 B1
(45) Date of Patent: Nov. 8, 2022

(54) TECHNIQUES FOR CONFIGURING A TRANSACTION FUNNEL

(71) Applicant: Vivint, Inc., Provo, UT (US)

(72) Inventors: Ryan Gee, Cedar Hills, UT (US); David Jones, Lehi, UT (US); Nicholas Rosenvall, Alpine, UT (US)

(73) Assignee: VIVINT, INC., Provo, UT (US)

( * ) Notice: Subject to any disclaimer, the term of this patent is extended or adjusted under 35 U.S.C. 154(b) by 57 days.

(21) Appl. No.: 16/398,236

(22) Filed: Apr. 29, 2019

(51) Int. Cl.
*G06Q 20/40* (2012.01)
*G06Q 30/00* (2012.01)

(52) U.S. Cl.
CPC ....... *G06Q 20/405* (2013.01); *G06Q 20/4014* (2013.01); *G06Q 30/01* (2013.01)

(58) Field of Classification Search
CPC .. G06Q 20/405; G06Q 20/4014; G06Q 30/01; G06Q 40/00
USPC ...................................... 705/35, 44
See application file for complete search history.

(56) References Cited

U.S. PATENT DOCUMENTS

| | | | | |
|---|---|---|---|---|
| 7,085,682 B1* | 8/2006 | Heller | ............... | G06Q 30/02 702/186 |
| 8,051,421 B2* | 11/2011 | Wylie | ............... | G06F 9/5038 709/224 |
| 2008/0262925 A1* | 10/2008 | Kim | ............... | G06N 20/00 705/14.27 |
| 2010/0175124 A1* | 7/2010 | Miranda | ............... | H04L 63/0263 726/13 |
| 2011/0231225 A1* | 9/2011 | Winters | ............... | G06Q 30/0269 705/7.29 |
| 2012/0023421 A1* | 1/2012 | Demant | ............... | G06F 9/452 715/765 |
| 2012/0221411 A1* | 8/2012 | Graham, Jr. | ............... | G06Q 30/02 705/14.52 |
| 2014/0122255 A1* | 5/2014 | Snyder | ............... | G06Q 30/0276 705/14.72 |
| 2014/0180815 A1* | 6/2014 | Chatwin | ............... | G06Q 30/0275 705/14.54 |
| 2016/0269497 A1* | 9/2016 | Glommen | ............... | H04L 67/306 |

\* cited by examiner

*Primary Examiner* — Christopher Bridges
*Assistant Examiner* — Timothy T. Hsieh
(74) *Attorney, Agent, or Firm* — Kunzler Bean & Adamson

(57) ABSTRACT

Methods, systems, and devices for techniques for configuring a transaction funnel are described. A server may receive, from a provider, a first set of rules for providing a product or service of the provider. The server may transmit, to an entity of the product or service, the first set of rules received from the provider. The server may receive, from the entity, a second set of rules for providing the product or service, where the second set of rules may be based on the first set of rules. Using the configuration techniques, the server may generate a transaction funnel associated with providing the product or service.

20 Claims, 11 Drawing Sheets

TECHNIQUES FOR CONFIGURING A TRANSACTION FUNNEL

BACKGROUND

The following relates generally to systems and data processing, and more specifically to techniques for configuring a transaction funnel.

A platform (i.e., a computing platform) may be employed by many users to store, manage, and process data using a shared network of remote servers. Users may develop applications on the platform to handle the storage, management, and processing of data. In some cases, the platform may utilize a database system. Users may access the platform using various user devices (e.g., desktop computers, laptops, smartphones, tablets, or other computing systems, etc.).

In some examples, the platform may support sales, services, marketing, community, analytics, and applications. A user may utilize the platform to help manage services, goods, or products provided to the user by a provider. For example, managing services provided by the provider may include analyzing data, storing and preparing communications, tracking opportunities, and tracking sales.

SUMMARY

The described features generally relate to improved methods, systems, and devices for techniques for configuring a transaction funnel. A server may receive, from a provider, a first set of rules for providing a product or service of the provider, and the server may transmit, to an entity of the product or service, the first set of rules. The server may receive, from the entity, a second set of rules for providing the product or service, where the second set of rules may be based on the first set of rules. Using the configuration techniques, the server may generate a transaction funnel associated with providing the product or service.

A method is described. The method may include receiving, from a provider, a first set of rules for providing a product or service of the provider, transmitting, to an entity of the product or service, the first set of rules received from the provider, receiving, from the entity, a second set of rules for providing the product or service in response to transmitting the first set of rules to the entity, the second set of rules based on the first set of rules, and generating a transaction funnel associated with providing the product or service, the transaction funnel based on the first set of rules and the second set of rules, the transaction funnel defining one or more procedures a representative completes before providing the product or service.

An apparatus is described. The apparatus may include a processor, memory in electronic communication with the processor, and instructions stored in the memory. The instructions may be executable by the processor to cause the apparatus to receive, from a provider, a first set of rules for providing a product or service of the provider, transmit, to an entity of the product or service, the first set of rules received from the provider, receive, from the entity, a second set of rules for providing the product or service in response to transmitting the first set of rules to the entity, the second set of rules based on the first set of rules, and generate a transaction funnel associated with providing the product or service, the transaction funnel based on the first set of rules and the second set of rules, the transaction funnel defining one or more procedures a representative completes before providing the product or service.

Another apparatus is described. The apparatus may include means for receiving, from a provider, a first set of rules for providing a product or service of the provider, means for transmitting, to an entity of the product or service, the first set of rules received from the provider, means for receiving, from the entity, a second set of rules for providing the product or service in response to transmitting the first set of rules to the entity, the second set of rules based on the first set of rules, and means for generating a transaction funnel associated with providing the product or service, the transaction funnel based on the first set of rules and the second set of rules, the transaction funnel defining one or more procedures a representative completes before providing the product or service.

A non-transitory computer-readable medium storing code is described. The code may include instructions executable by a processor to receive, from a provider, a first set of rules for providing a product or service of the provider, transmit, to an entity of the product or service, the first set of rules received from the provider, receive, from the entity, a second set of rules for providing the product or service in response to transmitting the first set of rules to the entity, the second set of rules based on the first set of rules, and generate a transaction funnel associated with providing the product or service, the transaction funnel based on the first set of rules and the second set of rules, the transaction funnel defining one or more procedures a representative completes before providing the product or service.

In some examples of the method, apparatuses, and non-transitory computer-readable medium described herein, the second set of rules may be a subclass of the first set of rules and may be configured to be complementary with the first set of rules.

In some examples of the method, apparatuses, and non-transitory computer-readable medium described herein, the transaction funnel includes the first set of rules and the second set of rules.

In some examples of the method, apparatuses, and non-transitory computer-readable medium described herein, the first set of rules indicate whether one or more rules of the first set of rules may be required or optional.

Some examples of the method, apparatuses, and non-transitory computer-readable medium described herein may further include operations, features, means, or instructions for determining that one or more rules of the first set of rules may be optional, and deactivating, within the second set of rules, the one or more rules of the first set of rules based on determining that the rule may be optional.

Some examples of the method, apparatuses, and non-transitory computer-readable medium described herein may further include operations, features, means, or instructions for determining that one or more rules of the first set of rules may be required, and activating, within the second set of rules, the one or more rules of the first set of rules based on determining that the rule may be required.

Some examples of the method, apparatuses, and non-transitory computer-readable medium described herein may further include operations, features, means, or instructions for determining a status of the first set of rules, the status indicating whether an action associated with the first set of rules may be complete or incomplete.

Some examples of the method, apparatuses, and non-transitory computer-readable medium described herein may further include operations, features, means, or instructions for transmitting, to the representative, a notification that the determined status of the first set of rules may be incomplete, and receiving, from the representative, an indication that the representative completed the action before providing the product or service.

In some examples of the method, apparatuses, and non-transitory computer-readable medium described herein, a transaction profile includes a plurality of providers associated with a plurality of transaction funnels, where each of the plurality of providers includes one of the plurality of transaction funnels.

Some examples of the method, apparatuses, and non-transitory computer-readable medium described herein may further include operations, features, means, or instructions for receiving a selection of the transaction funnel from the plurality of transaction funnels associated with the plurality of providers.

Some examples of the method, apparatuses, and non-transitory computer-readable medium described herein may further include operations, features, means, or instructions for determining one or more relationships between the provider and the entity, where generating the transaction funnel may be based on the one or more relationships.

Some examples of the method, apparatuses, and non-transitory computer-readable medium described herein may further include operations, features, means, or instructions for generating a transaction profile to display the transaction funnel based on the first set of rules and the second set of rules, and transmitting the transaction profile based on generating the transaction profile.

Some examples of the method, apparatuses, and non-transitory computer-readable medium described herein may further include operations, features, means, or instructions for receiving an authorization credential associated with a log-in request, and validating an identity of a person based on receiving the authorization credential, where generating the transaction funnel may be based on the identity of the person.

Some examples of the method, apparatuses, and non-transitory computer-readable medium described herein may further include operations, features, means, or instructions for receiving a request associated with the product or service, where generating the transaction funnel may be based on receiving the request, where the request includes a confirmation of an identity of a person, a confirmation of an appointment to install the product or service, a notification to pay for the product or service, a quality survey associated with the representative that provides the product or service to the person, or a combination thereof.

In some examples of the method, apparatuses, and non-transitory computer-readable medium described herein, the transaction funnel includes metadata, one or more application programming interfaces (APIs), one or more webhooks, one or more messaging platforms, or a combination thereof.

In some examples of the method, apparatuses, and non-transitory computer-readable medium described herein, the first set of rules includes one or more service details, a commission structure, a service status, one or more service requirements, a service workflow, or a combination thereof.

Certain examples of the present disclosure may include some, all, or none of the above advantages or features. One or more other technical advantages or features may be readily apparent to those skilled in the art from the figures, descriptions, and claims included herein. Moreover, while specific advantages or features have been enumerated above, various examples may include all, some, or none of the enumerated advantages or features.

Further scope of the applicability of the described methods and systems will become apparent from the following detailed description, claims, and drawings. The detailed description and specific examples are given by way of illustration only, since various changes and modifications within the spirit and scope of the description will become apparent to those skilled in the art.

DETAILED DESCRIPTION

A provider may provide goods, products, or services to customers through one or more representatives and/or entities. Some steps for selling a good, product, or service may be unique to the provider and/or the good, product, or service being provided. In some cases, a system may be configured to allow customized processes that the service provider leads a customer through to purchase the goods, products, or services (e.g., a customized sales funnel or transaction funnel). The steps of the customized processes may be tailored to the provider or good, product, or service, or a combination thereof. In some examples, managing the input from the provider and the associated entities may be a dynamic configuration in which the configuration is updated based on the input.

An entity utilizing the configuration of a provider may be able to apply the practices and configurations associated with the provider itself. For example, a dealer, an entity, or sales group that may be selling the good, product, or service may apply their sales practices and configuration in order to achieve maximum sales revenue. The system may be configured to generate a transaction funnel that includes rule sets and practices from each of the provider, dealers, entities, and sales groups involved in the sales funnel. In such a system, principles of rule inheritance may be used to propagate the settings from provider to various entities associated with the provider or associated with providing the good, product, or service. The configuration may drive a customized experience (e.g., sales experience) for an entity, thereby allowing the sales platform to be adapted to how that entity conducts their sales processes. In some cases, the configuration may include steps in the transaction funnel such as the ability to activate or deactivate steps, determine which steps are required, and configure specific details of the transaction funnel.

For example, the provider may transmit, to the system, a first set of rules for providing the service. The first set of rules may be transmitted to an entity of the service where the entity may be an entity associated with the provider. The system may then receive a second set of rules from the entity where the second set of rules may be a subclass of the first set of rules. In such cases, a transaction funnel may be generated. The transaction funnel may be based on the first set of rules and the second set of rules.

Aspects of the disclosure are initially described in the context of an environment supporting a transaction funnel associated with a service provider, a good, a product, or a service, or a combination thereof. Additional aspects of the disclosure are described with respect to systems and process flows. Aspects of the disclosure are further illustrated by and described with reference to apparatus diagrams, system diagrams, and flowcharts that relate to techniques for configuring a transaction funnel.

Figure 1:
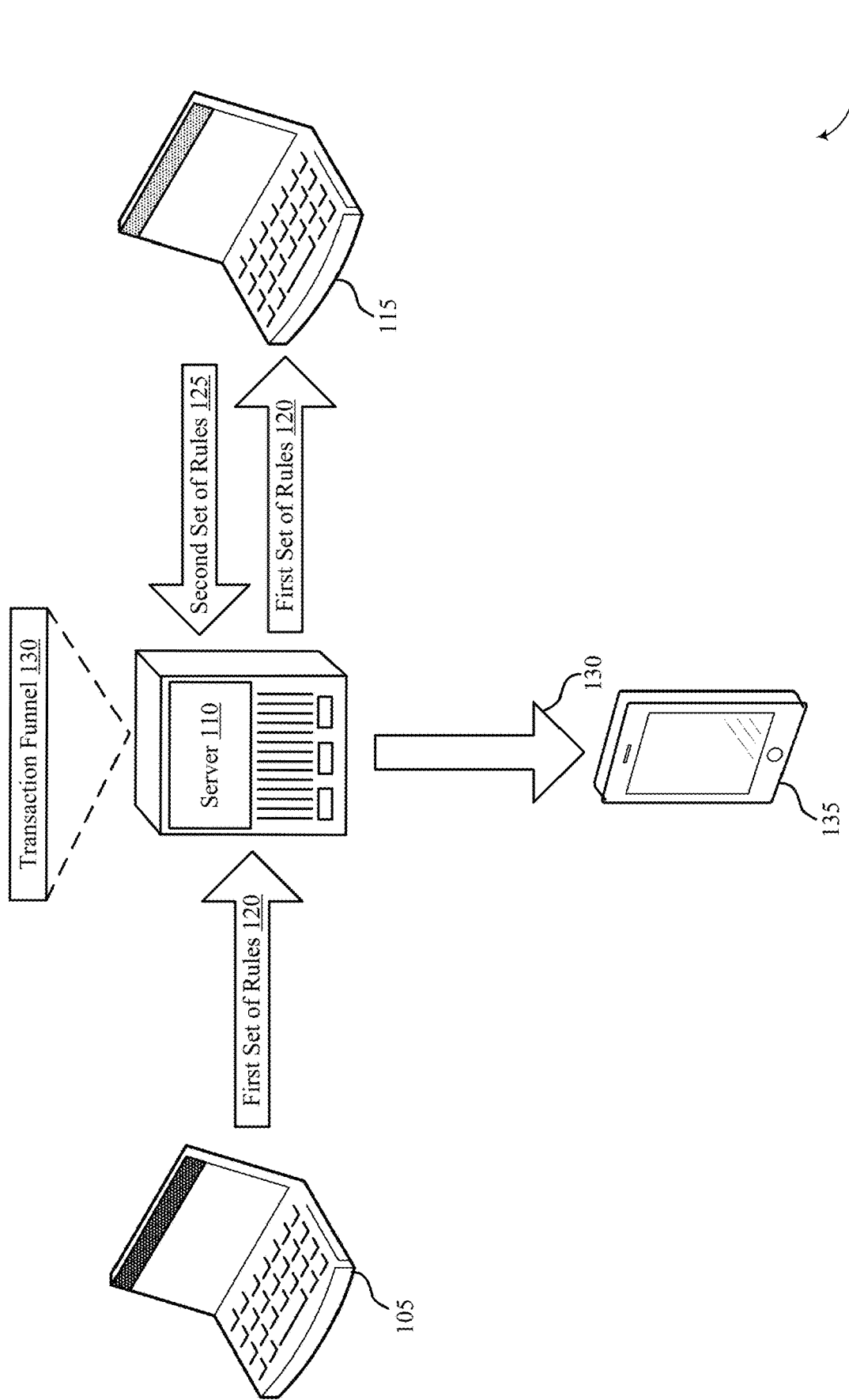
FIG. 1 illustrates an example of a system that supports techniques for configuring a transaction funnel in accordance with aspects of the present disclosure.

FIG. 1 illustrates an example of a system 100 that supports techniques for configuring a transaction funnel in accordance with aspects of the present disclosure. The system may include a provider 105, a server 110, an entity 115, and a representative 135.

The provider 105 may be an example of a user device, such as a server, a smartphone, or a laptop. In other examples, the provider 105 may be a desktop computer, a tablet, a sensor, or another computing device or system capable of generating, analyzing, transmitting, or receiving communications. In some examples, the provider 105 may be operated by a user that is part of a business, an enterprise, a non-profit, a startup, or any other organization type. The provider 105 may access server 110 to store, manage, and process the data associated with the communications, opportunities, purchases, sales.

The provider 105 may be an example of any entity that provides goods, products, or services to a customer. For example, the provider 105 may be an example of a service provider. In some cases of the disclosure for clarity purposes, the term services may refer to goods, products, or services. For example, the service may be sold to the customer or installed at a premise associated with the customer. The provider 105 may transmit a first set of rules 120 to the server 110. In such cases, the server 110 may receive the first set of rules 120 for providing a service of the provider 105. The server 110 may transmit the first set of rules 120 to an entity 115 of the service.

The server 110 may be an example of a single server or a server cluster, or may be an example of one or more software modules implemented within other devices. The server 110 may be an example of a public or private network. For example, server 110 may offer an on-demand database service to the provider 105 and entity 115. In some cases, server 110 may be an example of a multi-tenant database system. In this case, server 110 may serve multiple providers 105 and entities 115 with a single instance of software. However, other types of systems may be implemented, including—but not limited to—client-server systems, mobile device systems, and mobile network systems. This may include support for sales, service, marketing, community, analytics, and applications.

In some cases, the provider 105 may develop applications to run on server 110. The server 110 may be implemented using remote servers. In some cases, the remote servers may be located at one or more data centers. The multiple servers may be used for data storage, management, and processing. The server 110 may utilize multiple redundancies for security purposes. In some cases, the data stored at server 110 may be backed up by copies of the data at a different data center (not pictured).

The entity 115 may be an example of a user device, such as a server, a smartphone, or a laptop. In other examples, the entity 115 may be a desktop computer, a tablet, a sensor, or another computing device or system capable of generating, analyzing, transmitting, or receiving communications. In some examples, the entity 115 may be operated by a user that is part of a business, an enterprise, a non-profit, a startup, or any other organization type. The entity 115 may access server 110 to store, manage, and process the data associated with the communications, opportunities, purchases, sales.

The entity 115 may be an example of a dealer that sells a good, product, or service associated with the provider or closes a deal for a provider 105. The entity 115 may be authorized by the provider 105 to sell goods, products, or services to the customer and close services to the customer on behalf of the provider 105. The entity 115 may receive the first set of rules 120 and transmit a second set of rules 125 to the server 110. The server 110 may receive, from the entity 115, the second set of rules 125 for providing the service. The second set of rules 125 may be based on the first set of rules 120. For example, the second set of rules 125 may be configured to be complimentary with the first set of rules 120 where the second set of rules 125 is a subclass of the first set of rules 120. The term entity 115 may refer to any quantity of dealers, sub-dealers, or sales groups included in a transaction funnel.

After the server 110 receives the second set of rules 125, the server 110 may generate a transaction funnel 130 associated with providing the service. In systems with more than one provider 205, the server 110 may generate a transaction funnel 130 for each provider 105 where the transaction funnel 130 is customized for the provider 105. The transaction funnel 130 may include the first set of rules 120 and the second set of rules 125. In some examples, the transaction funnel 130 may define one or more procedures a representative completes before providing the service. In some cases, the server 110 may transmit the transaction funnel 130 to the representative 135. In some examples, the transaction funnel 130 is a sales funnel. The transaction funnel 130 may include metadata, one or more application programming interfaces (APIs), one or more webhooks, or one or more messaging platforms.

In some systems, a transaction funnel may be configured based on a single input from an entity rather than based on the input from multiple entities (e.g., a provider 105 and an entity 115). Thus, the transaction funnel configuration is static. In such cases, each provider and each dealer or entity associated with the provider may generate a separate transaction funnel. In this way, the system is not customizable.

The system 100 may utilize techniques for generating transaction funnels to allow the rules or settings input by the provider 105 to be modified or added by other related entities. For example, the settings associated with the provider 105 may be cascaded to other entities, thereby driving a customized experience as additional providers and associated entities are onboarded. In such cases, the transaction funnel 130 may be customized to the individual (e.g., customer) associated with the service. The system 100 may allow for an efficient and secure mechanism to close deals (e.g., sales deals), thereby improving and enabling the sales process.

For example, a provider 105 may sell and provide a service. The provider may produce and market the service according to a set of rules that may be unique to the process of the provider 105. For example, the provider 105 may include a certain means to collect information and market the service to customers. In some examples, utilizing system 100 to configure a transaction funnel 130 may allow the provider 105 to close the deal and use the process to increase the effectiveness of the processes of the provider 105.

It should be appreciated by a person skilled in the art that one or more aspects of the disclosure may be implemented in a system 100 to additionally or alternatively solve other problems than those described above. Furthermore, aspects of the disclosure may provide technical improvements to existing systems or processes as described herein. However, the description and appended drawings only include example technical improvements resulting from implementing aspects of the disclosure, and accordingly do not represent all of the technical improvements provided within the scope of the claims.

Figure 2:
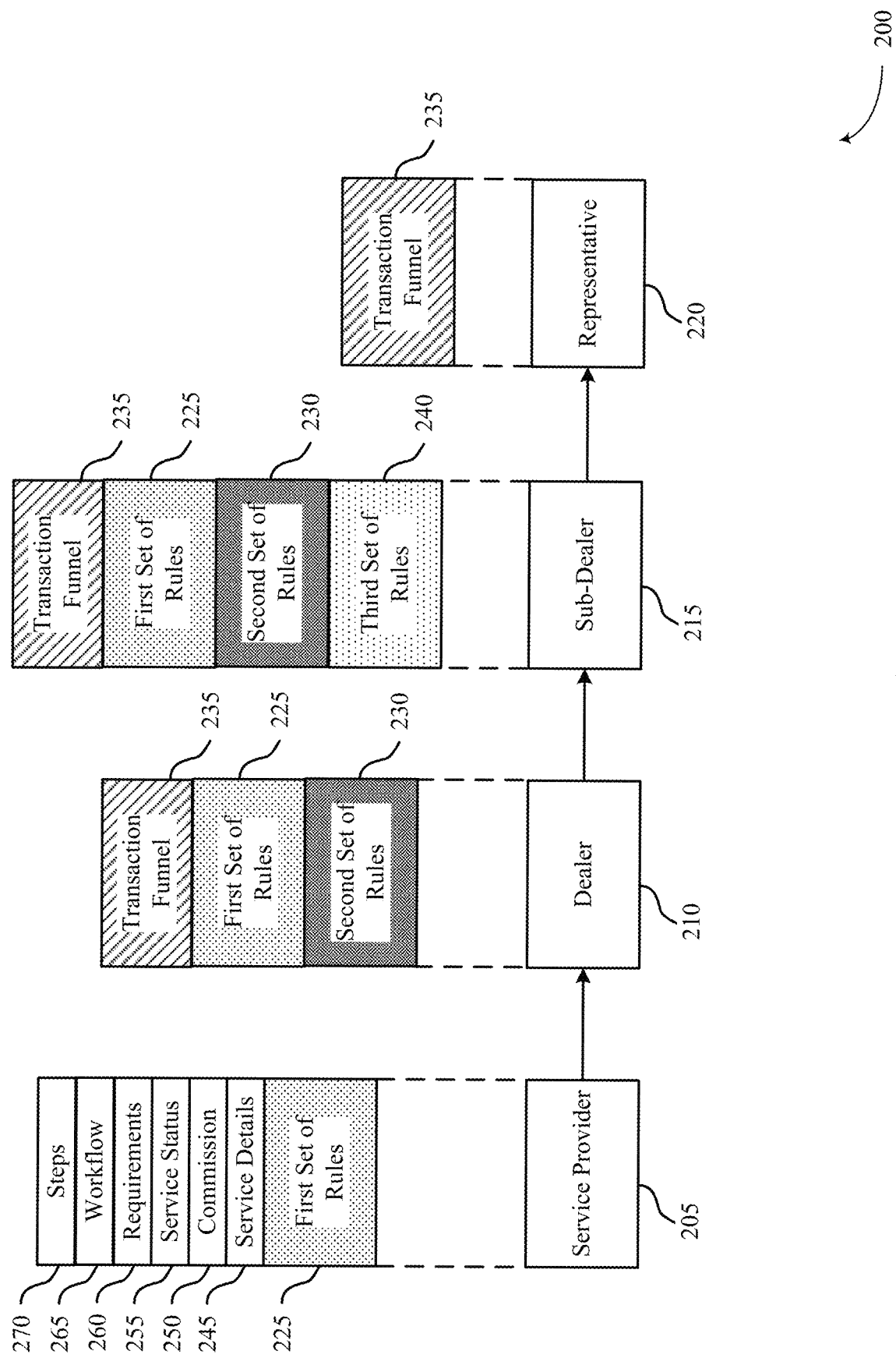
FIGS. 2 and 3 illustrate examples of configuration systems that support techniques for configuring a transaction funnel in accordance with aspects of the present disclosure.

FIG. 2 illustrates an example of a configuration system 200 that supports techniques for configuring a transaction funnel in accordance with aspects of the present disclosure. The configuration system 200 may include a provider 205 sending data to the dealer 210. The configuration system 200 may also include the dealer 210 sending data to the sub-dealer 215 and the sub-dealer 215 sending data to the representative 220. The provider 205, dealer 210, and representative 220 may each be an example of provider 105, entity 115, and representative 135, as described with reference to FIG. 1.

In order to onboard a new good, product, or service there may be several steps that occur. The steps may be unique to the service offered by the provider 205 in order to address the procedures of the provider 205. The provider 205 may provide the server with a first set of rules 225. The first set of rules 225 may be an example of the first set of rules 120, as described with reference to FIG. 1. The first set of rules 225 may include service details 245, a commission structure 250, a service status 255, service requirements 260, a service workflow 265, and service steps 270.

The service details 245 may be included within the first set of rules 225 and may include the details about the service provided by the provider 205. For example, the service details 245 may include a name of the provider 205, a description of the provider 205, the hours of operation of the provider 205, and technical support contact information for the provider 205. In some examples, the service details 245 may describe the service that is provided by the provider 205, who is providing the service, and how the service will be provided (e.g., via phone call, home visit, or delivery).

Each service may include a commission structure tied to the service. For example, the commission structure 250 may include the structure for paying the commission to dealers, lead setters (e.g., representatives 220), closers, installers, or other representatives. In such cases, the commission structure 250 may include how the commission is structured. For example, the commission structure 250 may include what steps and statuses trigger commission payouts. The commission structure 250 may also be configured to determine the frequency and time for when commissions are paid out. In some cases, the commission structure 250 may be cascaded to the dealer 210 and subsequent entities (e.g., sub-dealer 215 and representative 220), as described below in more detail. In such cases, each entity following the provider 205 may take a cut of the commission as the commission structure 250 may cascade to subsequent entities.

The first set of rules 225 may include the service status 255. The service status 255 may be configured based on events that occur during the lifecycle of the service. For example, the service status 255 may determine if the service is active or inactive. In other cases, the first set of rules 225 may include the service requirements 260. The service requirements 260 may include a status associated with the steps to provide the service. For example, the service requirements 260 may be indicated if the steps are required or optional. In some cases, the service requirements 260 may include the minimum amount of data required for the service to be provided. For a customer to qualify for an account with the provider 205, the customer may be required to meet the service requirements 260 included within in the first set of rules 225.

The service workflow 265 may allow the provider 205 to configure which steps, status, and procedures occur throughout the lifecycle of the service. The lifecycle of the service may extend from the time the server receives a request for the service to the time of completion. The service workflow 265 may be implemented using an orchestration engine customized for the service provided by the provider 205. The orchestration engine may be a computing engine configured to automate coordination and management of computer resources and services. The orchestration engine may allow for deployment and execution of interdependent workflows on external resources. The service workflow 265 may be based on steps to complete the service and when the steps may occur. In some examples, the service workflow 265 may process each step of the workflow. In some cases, the service workflow 265 may include a messaging or notification system for notifying a representative of a lead, a due date of a payment of commission, or a cancellation of an appointment to provide the service.

The first set of rules 225 may include service steps 270. Service steps 270 may include actions taken by the representative to provide the goods, products, or services to the customer. In some cases, each step included in the service steps 270 may be created and configured based on the provider 205. For example, the service steps 270 may include a time to dispatch a technician to provide the service, a time when the technician is on site for the installation, and a time of completion for the installation.

The first set of rules 225 may be transmitted from the provider 205 to the dealer 210. In such cases, the service details 245, the commission structure 250, the service status 255, the service requirements 260, the service workflow 265, and the service steps 270 may be transmitted from the provider 205 to the dealer 210. The dealer 210 may inherit the configuration of the first set of rules 225 of the preceding entity (e.g., provider 205).

The cascading effect in which the service and transaction funnel 235 is inherited at the dealer 210 from the provider 205 may allow the dealer 210 to add the second set of rules 230 to the first set of rules 225. In such cases, the transaction funnel 235 may be configured at each entity level (e.g., at the dealer 210). For example, the dealer 210 may inherit the first set of rules 225, and in some case, may include the second set of rules 230. The second set of rules 230 may be a subclass of the first set of rules 225 in which the second set of rules 230 may be configured to be complementary with the first set of rules 225. For example, the second set of rules 230 may not include rules that contradict the first set of rules 225. The transaction funnel 235 may include the first set of rules 225 and the second set of rules 230.

In some cases, the second set of rules 230 may override the first set of rules 225 based on the procedures of the dealer 210. For example, the first set of rules 225 may indicate whether one or more rules of the first set of rules 225 are required or optional. In such cases, the server may determine that one or more rules of the first set of rules 225 are optional. If one or more rules of the first set of rules 225 are optional, the one or more rules of the first set of rules 225 may be deactivated, at the dealer 210, within the second set of rules 230. In other examples, the server may determine that one or more rules of the first set of rules 225 are required. If one or more rules of the first set of rules 225 are required, the one or more rules of the first set of rules 225 may be activated, at the dealer 210, within the second set of rules 230. In such cases, the rules associated with the first set of rules 225 and the second set of rules 230 may be dynamically rendered at the dealer 210.

The provider 205 be associated with one or more goods, products, or services. This association may determine which good, products, or services may be available to the provider 205 as well as the entities associated with the provider (e.g., dealer 210). The transaction funnel 235 may be associated with the service and the dealer 210. The association of the transaction funnel 235 to the dealer 210 may allow the succeeding entity (e.g., sub-dealer 215) to inherit the transaction funnel 235, thereby ensuring that the lifecycle for the provider 205 and the service may be tracked.

The transaction funnel 235 (e.g., including the first set of rules 225 and the second set of rules 230) may be transmitted from the dealer 210 to the sub-dealer 215. The sub-dealer 215 may be an individual entity within a dealership. The sub-dealer 215 may inherit the configuration of the first set of rules 225 and the second set of rules 230 of the preceding entity (e.g., dealer 210). The cascading effect in which the service and transaction funnel 235 may be inherited at the sub-dealer 215 from the dealer 210 may allow the sub-dealer 215 to add a third set of rules 240 to the transaction funnel 235.

In such cases, the transaction funnel 235 may be configured at each entity level (e.g., at the sub-dealer 215). For example, the sub-dealer 215 may inherit the first set of rules 225 and the second set of rules 230, and in some case, may include the third set of rules 240. The third set of rules 240 may be a subclass of the first set of rules 225 and the second set of rules 230. The third set of rules 240 may be configured to be complementary with the first set of rules 225 and the second set of rules 230. For example, the third set of rules 240 may not include rules that contradict the first set of rules 225 and the second set of rules 230. The transaction funnel 235 may include the first set of rules 225, the second set of rules 230, and the third set of rules 240.

In some cases, if the dealer 210 deactivates rules of the first set of rules 225, then the deactivated rules may not be propagated to the sub-dealer 215. In other examples, if the dealer 210 activates rules of the first set of rules 225, then the activated rules may be propagated to the sub-dealer 215.

The transaction funnel 235 (e.g., including the first set of rules 225, the second set of rules 230, and the third set of rules 240) may be transmitted from the sub-dealer 215 to the representative 220. The representative 220 may be a setter or a closer for the service. The representative 220 may be a sub-class of the dealer 210 and the sub-dealer 215. In some cases, the representative 220 may be the individual that interacts with the customer. The representative 220 may inherit the configuration of the first set of rules 225, the second set of rules 230, and the third set of rules 240 of the preceding entity (e.g., sub-dealer 215).

In some cases, there may be an action associated with the first set of rules 225. In some cases, the action associated with the first set of rules 225 may be required or optional. In such cases, the provider 205 may control which rules of the first set of rules 225 may be mandatory to complete before allowing a lead to be submitted. For example, the server may determine the status of the first set of rules 225 where the status indicates whether the action associated with the first set of rules 225 is complete or incomplete. The sub-dealer 215 may transmit a notification to the representative 220 that the determined status of the first set of rules 225 is incomplete. In response to receiving the notification, the representative 220 may transmit an indication that the representative 220 completed the action before providing the service.

The server may configure different transaction funnels (e.g., transaction funnel 235) for different goods, products, or services, different provider, or both. For example, the server may configure a first transaction funnel for a product associated with a first service. In other examples, the server may configure a second transaction funnel different than the first transaction funnel for a service associated with a second service, where the second service is different than the first service. In such cases, the server may independently configure transactions funnels for different goods, products, or services, different providers, or both.

Figure 3:
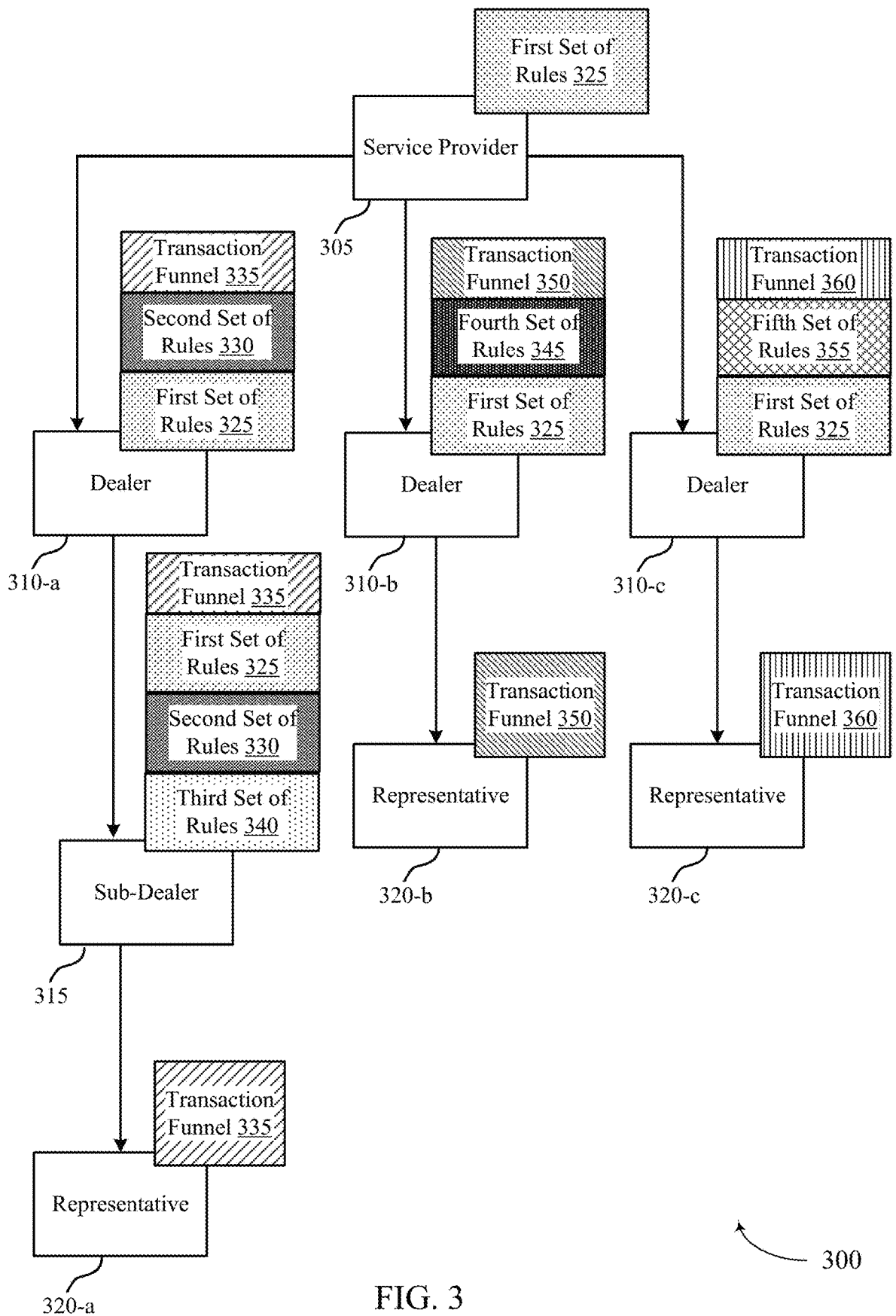

FIG. 3 illustrates an example of a configuration system 300 that supports techniques for configuring a transaction funnel in accordance with aspects of the present disclosure. The configuration system 300 may include a provider 305 sending data to a dealer **310-*a*, a dealer 310-*b*, and a dealer 310-*c*. The configuration system 300 may also include the dealer 310-*a* sending data to a sub-dealer 315 and the sub-dealer 315 sending data to a representative 320-*a*. The configuration system 300 may also include the dealer 310-*b* sending data to a representative 320-*b* and the dealer 310-*c* sending data to a representative 320-*c*. The provider 305, dealers 310-*a*, 310-*b*, and 310-*c*, sub-dealer 315, and representatives 320-*a*, 320-*b*, and 320-*c* may each be an example of provider, dealer, sub-dealer, and representative, as described with reference to FIGS. 1 and 2. Dealers 310-*a*, 310-*b*, and 310-*c* may each be an example of the entity 115, as described with reference to FIG. 1**.

There are many types of entities that may be configured as part of a sales process. For example, a type of entity may include the provider 305, the dealers **310-*a*, 310-*b*, and 310-*c*, the sub-dealer 315, and the representatives 320-*a*, 320-*b*, and 320-*c*. The entities may be hierarchical and may have a relationship where the management of the subsequent entity is based on the preceding entity. For example, the management of the dealer 310-*a* may be based on the provider 305. The management of the sub-dealer 315-*a* may be based on the dealer 310-*a*, and the management of the representative 320-*a* may be based on the sub-dealer 315. In some cases, the type of entity may include a dealer favorite. For example, the dealer favorite may be a dealer setter to a master dealer. In such cases, a lead may be submitted to a proceeding entity rather than the provider 305. The dealer favorite may be a source for actions provided by the representative (e.g., representative 320-*a*, 320-*b*, or 320-*c***).

In such cases, one or more relationships may be determined between the entities where generating the transaction funnel is based on the one or more relationships. In some examples, the relationships may be an example of a contractual relationship in which the subsequent entity may receive a portion of the commission and the preceding entity may receive a portion of the commission. One or more relationships may be an example of franchise relationships, employments relationships, other types of relationships, or a combination thereof.

In some cases, the provider 305 may be able to analyze the transaction funnel 335 of the dealer **310-*a*, the transaction funnel 350 of the dealer 310-*b***, and the transaction funnel 360 of the dealer 310-c. For example, the provider 305 may be able to analyze the transaction funnel 335 of the sub-dealer 315, and the transaction funnel 335 of the representative 320-a. The provider 305 may be able to analyze the transaction funnel 350 of the representative 320-b and the transaction funnel 360 of the representative 320-c. However, the dealer 310-a, 310-b, and 310-c may not be able to analyze the transaction funnel of each other. For example, the dealer 310-a may not be able to analyze the transaction funnel 350 of the dealer 310-b or the transaction funnel 360 of the dealer 310-c. In other examples, the sub-dealer 315 may not be able to analyze the transaction funnel 335 of the dealer 310-a. In such cases, the ability to analyze the transaction funnels may occur from subsequent to preceding entities.

In some cases, a transaction funnel may be configured at each entity where each subsequent entity inherits the configuration of the preceding entity. For example, the first set of rules 325 may be transmitted from the provider 305 to the dealer 310-a, 310-b, and 310-c. In such cases, the dealer 310-a, 310-b, and 310-c may each inherit the configuration of the first set of rules 325 of the preceding entity (e.g., provider 305). The first set of rules 325 may be an example of the first set of rules, as described with reference to FIGS. 1 and 2.

The cascading effect in which the service and transaction funnel may be inherited at the dealers from the provider 305 may allow the dealers to add a different set of rules to the first set of rules 325. For example, the dealer 310-a may inherit the first set of rules 325 and may add the second set of rules 330. The dealer 310-b may inherit the first set of rules 325 and may add the fourth set of rules 345. The dealer 310-c may inherit the first set of rules 325 and may add the fifth set of rules 355. The second set of rules 330, fourth set of rules 345, and the fifth set of rules 355 may each be an example of the second set of rules, as described with reference to FIGS. 1 and 2.

In some cases, the transaction funnel 335 may be transmitted from the dealer 310-a to the sub-dealer 315. The transaction funnel 335 may be inherited at the sub-dealer 315 from the dealer 310-a, thereby allowing the sub-dealer 315 to add a third set of rules 330 to the transaction funnel 335. The third set of rules 330 may be an example of the third set of rules 240, as described with reference to FIG. 2.

In some examples, the transaction funnel 335 may be transmitted from the sub-dealer 315 to the representative 320-a. The transaction funnel 350 may be transmitted from the dealer 310-b to the representative 320-b, the transaction funnel 360 may be transmitted from the dealer 310-c to the representative 320-c.

Figure 4:
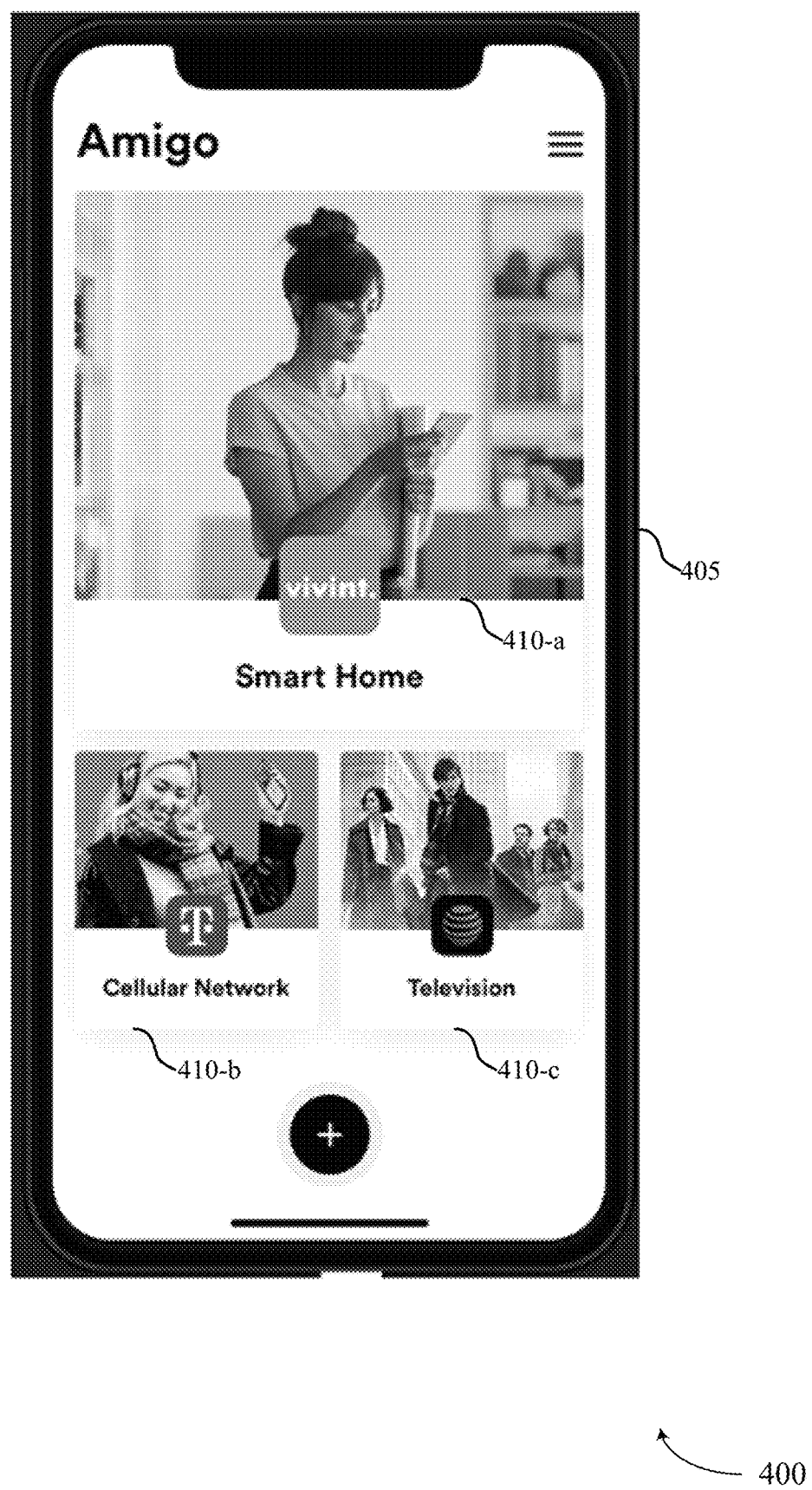
FIGS. 4 and 5 illustrate examples of display configurations that support techniques for configuring a transaction funnel in accordance with aspects of the present disclosure.

FIG. 4 illustrates an example of a display configuration 400 that supports techniques for configuring a transaction funnel in accordance with aspects of the present disclosure. The display configuration 400 may include a profile 405. Profile 405 may be an example of a transaction profile. The profile 405 of a representative may be dynamically rendered based on the generation and configuration of the transaction funnel. The profile 405 may include a plurality of different services (e.g., services 410-a, 410-b, 410-c, or the like) that may be provided by the representative. For example, the profile 405 may include a first transaction funnel for providing a first service 410-a, a second transaction funnel for a second service 410-b, and a third transaction funnel for a third service 410-c. While three services are shown, the profile 405 may include any quantity of services associated with the representative. The configuration of the profile 405 may allow for a customized sales experience for the entity (e.g., a representative) that may be interacting with the profile 405.

Profile 405 may be an example of an offer screen presented to a representative. For example, the profile 405 may be displayed via a web application executed by a user device such as a phone, laptop, tablet, computer, or other electronic devices. The representative may log on to the web application and based on the transaction funnel, the profile 405 may display the first service 410-a associated with the first set of rules, the second service 410-b associated with the second set of rules, and the third service 410-c associated with the third set of rules.

In some cases, the server may receive an authorization credential associated with a log-in request. The server may validate an identity of a person (e.g., representative) based on receiving the authorization credential. In such cases, the profile 405 (e.g., transaction funnels for each of the first service 410-a, second service 410-b, and third service 410-c) may be generated based on the authorization. When the profile 405 displays the configuration, the configurability may have been previously executed, thereby allowing the representative to interact with the profile 405 for a tailored experience based on the transaction funnel for the specific services (e.g., services 410-a, 410-b, 410-c, or the like).

In some cases, the profile 405 may include a plurality of providers associated with a plurality of transaction funnels. For example, each of the plurality of providers may include one of the plurality of transaction funnels. The profile 405 may allow the representative to send and receive leads between the provider and the representative. For example, the server may receive a selection of the transaction funnel (e.g., first service 410-a, second service 410-b, and third service 410-c) from a plurality of transaction funnels associated with a plurality of providers displayed via the profile 405.

Figure 5:
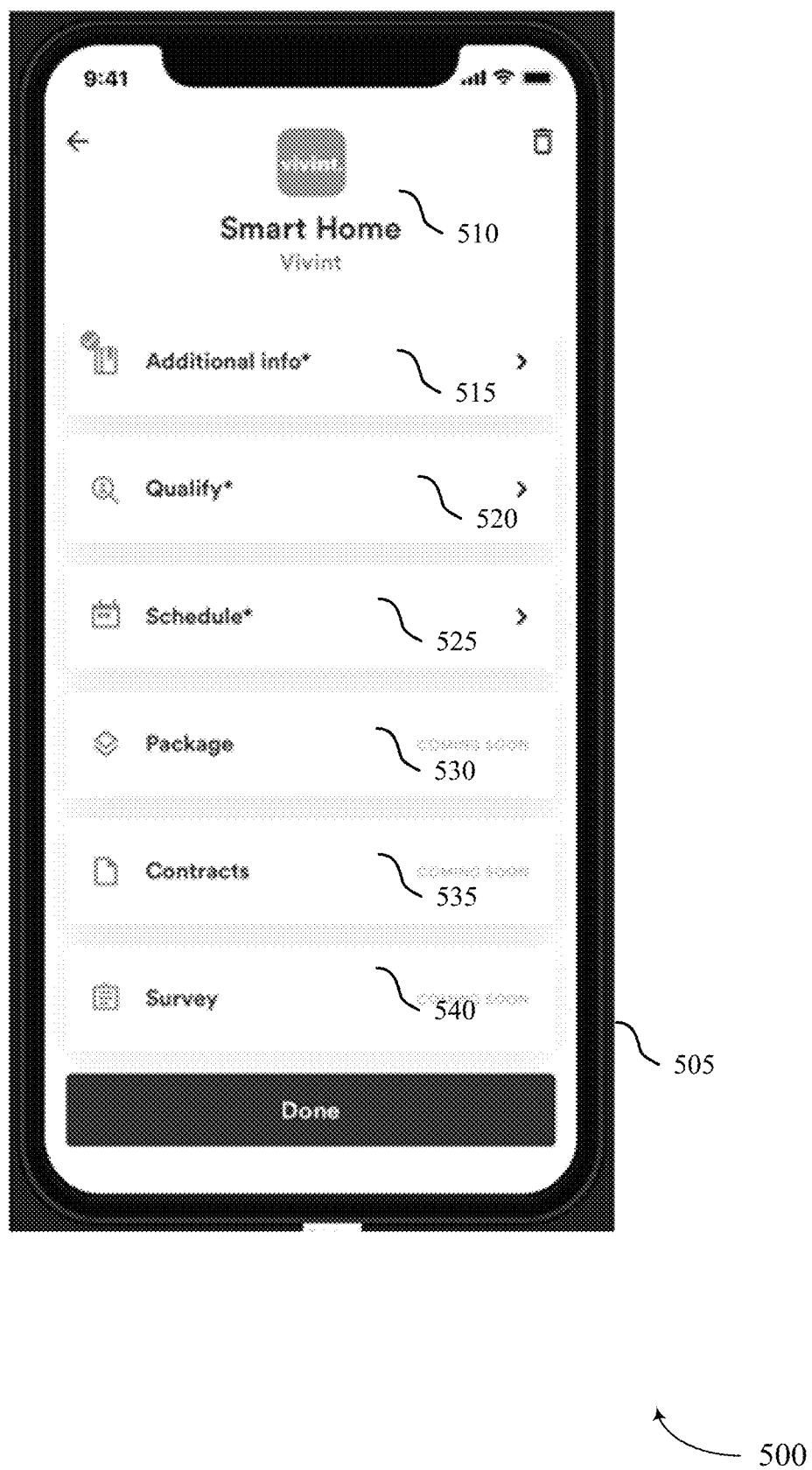

FIG. 5 illustrates an example of a display configuration 500 that supports techniques for configuring a transaction funnel in accordance with aspects of the present disclosure. The display configuration 500 may include a transaction funnel 505 for a specific service 510 associated with a provider. Transaction funnel 505 may include service details 515, qualification component 520, scheduling component 525, delivery component 530, contract component 535, and survey component 540. The transaction funnel 505 may be an example of the transaction funnel, as described with reference to FIGS. 1 through 4. The service 510 may be an example of the service, as described with reference to FIGS. 1 through 4.

The transaction funnel 505 may be dynamically rendered based on the generation and configuration of the transaction funnel 505. For example, the transaction funnel 505 may be configured based on the sets of rules of the provider and/or entities. The configuration of the transaction funnel 505 may allow for a customized sales experience for the entity (e.g., representative) that may be interacting with the transaction funnel 505. The transaction funnel 505 may depict steps associated with the transaction funnel 505. The steps may be rendered based on the selected service 510 associated with the provider. For example, the steps may include service details 515, qualification component 520, scheduling component 525, delivery component 530, contract component 535, and survey component 540. The steps may be accessed (e.g., clicked on) to provide additional information associated with the service.

The transaction funnel 505 may be displayed via a web application executed by a user device such as a phone, laptop, tablet, computer, or other electronic device. The representative may log on to the web application and based on the transaction funnel 505, the transaction funnel 505 may display the provider associated with the first set of rules. In some cases, the transaction funnel 505 may be generated to display the transaction funnel 505 based on the first set of rules. The transaction funnel 505 may be transmitted to a user device to display the transaction funnel 505.

In some cases, the server may receive a request associated with the transaction funnel 505. For example, the request may include a confirmation of an identity of a person via the qualification component 520. For example, when the qualification component 520 is accessed (e.g., clicked on), the representative may be presented with additional fields related to confirming the identity of the person such as a name field, an address field, a contact number field, or a combination thereof. In some examples, the request may include a confirmation of an appointment to install the service 510 associated with the provider via the scheduling component 525. For example, when the scheduling component 525 is accessed, the representative may be presented with a calendar that displays scheduled appointments and available appointments. The server may receive, via the contract component 535, the request where the request includes a notification to pay for the service 510. In some cases, the server may receive, via the survey component 540, a quality survey associated with the representative that provides the service 510 to the consumer.

Figure 6:
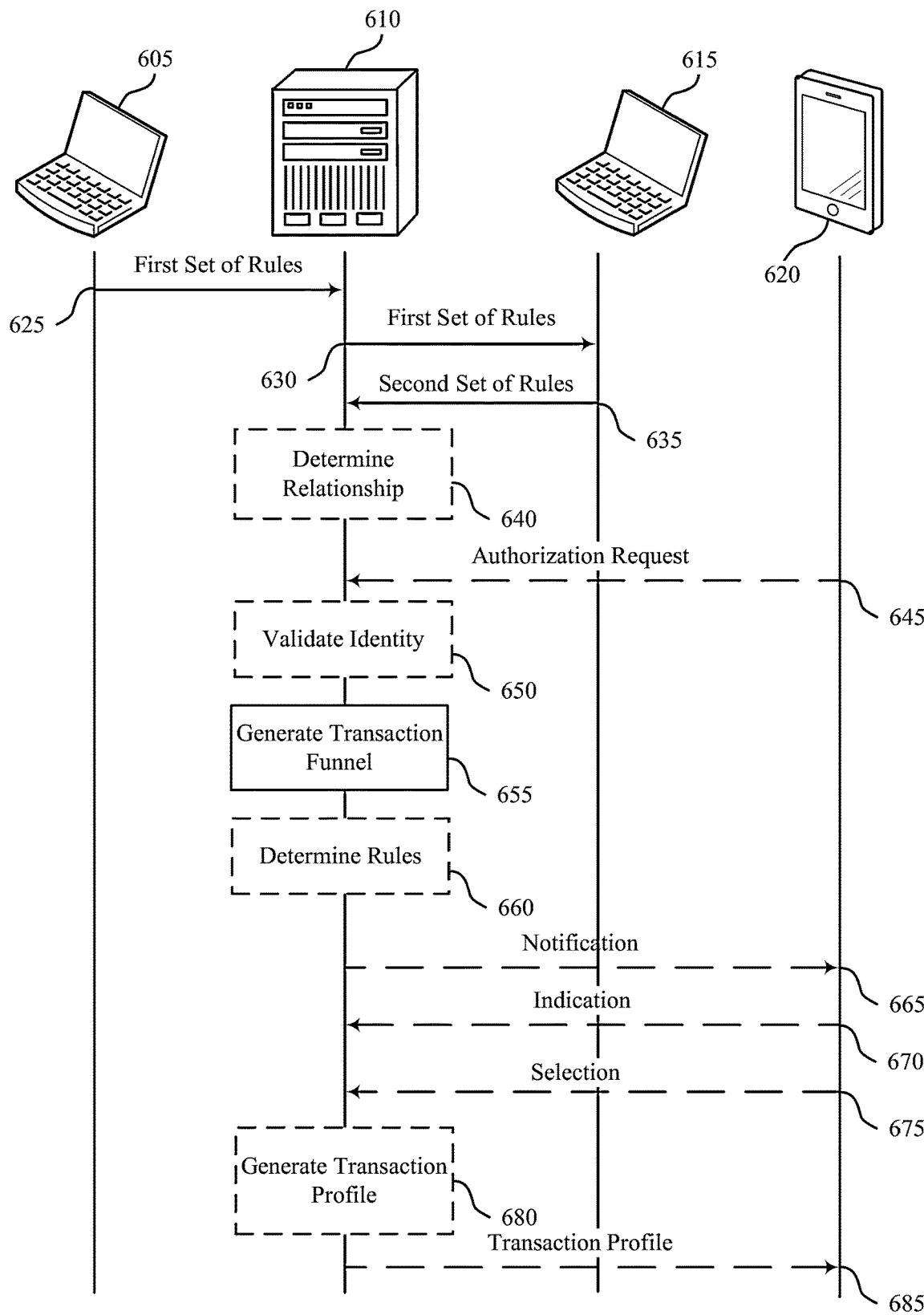
FIG. 6 illustrates an example of a process flow that supports techniques for configuring a transaction funnel in accordance with aspects of the present disclosure.

FIG. 6 illustrates an example of a process flow 600 that supports techniques for configuring a transaction funnel in accordance with aspects of the present disclosure. The process flow may include a provider 605, a server 610, an entity 615, and a representative 620. The provider 605, the server 610, the entity 615, and the representative 620 may be examples of the corresponding devices with respect to FIGS. 1 through 5. Alternative examples of the following may be implemented, where some steps are performed in a different order than described or not performed at all. In some cases, steps may include additional features not mentioned below, or further steps may be added.

At 625, the server 610 may receive, from the provider 605, a first set of rules for providing a product or service of the provider 605. In some cases, the first set of rules indicate whether one or more rules of the first set of rules are required or optional. The first set of rules may comprise one or more service details, a commission structure, a service status, one or more service requirements, a service workflow, or a combination thereof. At 630, the server 610 may transmit, to an entity 615 of the product or service, the first set of rules received from the provider 605.

At 635, the server 610 may receive, from the entity 615, a second set of rules for providing the product or service. The second set of rules may be received in response to transmitting the first set of rules to the entity 615. In some cases, the second set of rules is based on the first set of rules. In some cases, the second set of rules is a subclass of the first set of rules and are configured to be complementary with the first set of rules.

At 640, the server 610 may determine one or more relationships between the provider 605 and the entity 615, where generating the transaction funnel is based on the one or more relationships. At 645, the server 610 may receive an authorization credential associated with a log-in request. The log-in request may be from the representative 620. At 645, the server 610 may receiving a request associated with the product or service, where generating the transaction funnel is based on receiving the request.

In some cases, the request comprises a confirmation of an identity of a person, a confirmation of an appointment to install the product or service, a notification to pay for the product or service, a quality survey associated with the representative that provides the product or service to the person, or a combination thereof. At 650, the server 610 may validate an identity of a person (e.g., representative 620) based on receiving the authorization credential, where generating the transaction funnel is based on the identity of the person.

At 655, the server 610 may generate a transaction funnel associated with providing the product or service. The transaction funnel may be on the first set of rules and the second set of rules. In some cases, the transaction funnel may define one or more procedures a representative 620 completes before providing the product or service. In some cases, the transaction funnel comprises the first set of rules and the second set of rules. The transaction funnel may comprise metadata, one or more APIs, one or more webhooks, one or more messaging platforms, or a combination thereof At 660, the server 610 may determine that one or more rules of the first set of rules are optional and deactivate, within the second set of rules, the one or more rules of the first set of rules based on determining that the rule is optional. In some cases, the server 610 may determine that one or more rules of the first set of rules are required and activate, within the second set of rules, the one or more rules of the first set of rules based on determining that the rule is required. At 660, the server 610 may determine a status of the first set of rules, the status indicating whether an action associated with the first set of rules is complete or incomplete.

At 665, the server 610 may transmit, to the representative 620, a notification that the determined status of the first set of rules is incomplete. At 660, the server 610 may receive, from the representative 620, an indication that the representative 620 completed the action before providing the product or service. At 665, the server 610 may receive a selection of the transaction funnel from a plurality of transaction funnels associated with a plurality of providers.

At 680, the server 610 may generate a transaction profile to display the transaction funnel based at least in part on the first set of rules and the second set of rules. In some cases, a transaction profile includes a plurality of providers associated with a plurality of transaction funnels, where each of the plurality of providers comprises one of the plurality of transaction funnels. At 685, the server 610 may transmit the transaction profile based at least in part on generating the transaction profile. The transaction profile may be transmitted to the representative 620.

Figure 7:
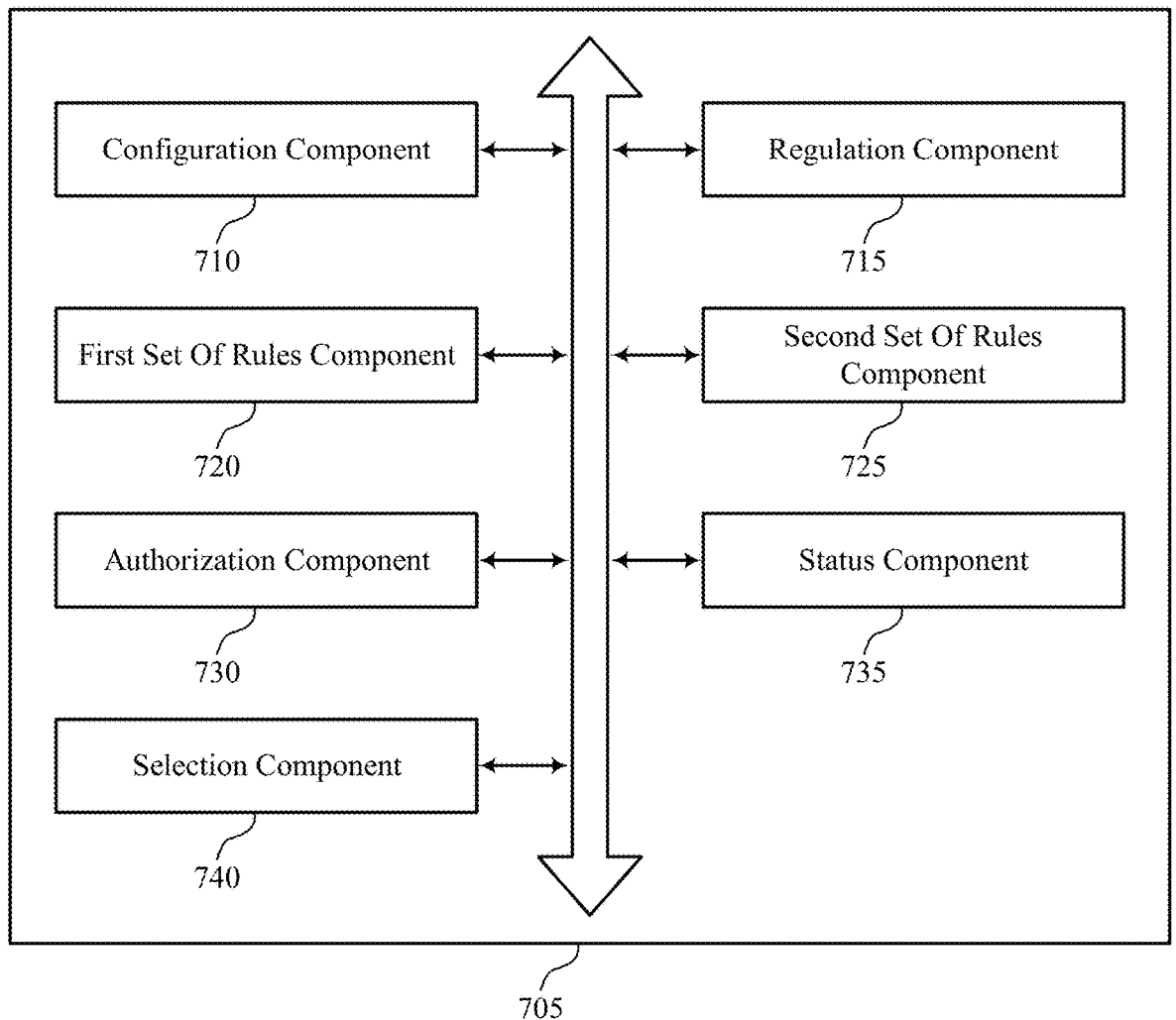
FIG. 7 illustrates a block diagram of a transaction funnel manager that supports techniques for configuring a transaction funnel in accordance with aspects of the present disclosure.

FIG. 7 illustrates a block diagram 700 of a transaction funnel manager 705 that supports techniques for configuring a transaction funnel in accordance with aspects of the present disclosure. The transaction funnel manager 705 may include a configuration component 710, a regulation component 715, a first set of rules component 720, a second set of rules component 725, an authorization component 730, a status component 735, and a selection component 740. Each of these modules may communicate, directly or indirectly, with one another (e.g., via one or more buses).

The transaction funnel manager 705 and/or at least some of its various sub-components may be implemented in hardware, software executed by a processor, firmware, or any combination thereof. If implemented in software executed by a processor, the functions of the transaction funnel manager 705 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The transaction funnel manager 705 and/or at least some of its various sub-components may be physically located at various positions, including being distributed such that portions of functions are implemented at different physical locations by one or more physical devices. In some examples, the transaction funnel manager 705 and/or at least some of its various sub-components may be a separate and distinct component in accordance with various aspects of the present disclosure. In other examples, the transaction funnel manager 705 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The configuration component 710 may generate a transaction funnel associated with providing the product or service, the transaction funnel based on the first set of rules and the second set of rules, the transaction funnel defining one or more procedures a representative completes before providing the product or service. In some examples, the configuration component 710 may generate a transaction profile to display the transaction funnel based on the first set of rules and the second set of rules. In some examples, the configuration component 710 may transmit the transaction profile based on generating the transaction profile.

In some examples, configuration component 710 may receive a request associated with the product or service, where generating the transaction funnel is based on receiving the request, where the request includes a confirmation of an identity of a person, a confirmation of an appointment to install the product or service, a notification to pay for the product or service, a quality survey associated with the representative that provides the product or service to the person, or a combination thereof. In some cases, the transaction funnel includes the first set of rules and the second set of rules.

In some cases, a transaction profile includes a plurality of providers associated with a plurality of transaction funnels, where each of the plurality of providers includes one of the plurality of transaction funnels. In some cases, the transaction funnel includes metadata, one or more application programming interfaces (APIs), one or more webhooks, one or more messaging platforms, or a combination thereof.

The regulation component 715 may transmit, to an entity of the product or service, the first set of rules received from the provider. In some examples, the regulation component 715 may determine that one or more rules of the first set of rules are optional. In some examples, the regulation component 715 may deactivate, within the second set of rules, the one or more rules of the first set of rules based on determining that the rule is optional.

In some examples, the regulation component 715 may determine that one or more rules of the first set of rules are required. In some examples, the regulation component 715 may activate, within the second set of rules, the one or more rules of the first set of rules based on determining that the rule is required. In some cases, the first set of rules indicate whether one or more rules of the first set of rules are required or optional.

The first set of rules component 720 may receive, from a provider, a first set of rules for providing a product or service of the provider. In some cases, the first set of rules includes one or more service details, a commission structure, a service status, one or more service requirements, a service workflow, or a combination thereof.

The second set of rules component 725 may receive, from the entity, a second set of rules for providing the product or service in response to transmitting the first set of rules to the entity, the second set of rules based on the first set of rules. In some cases, the second set of rules is a subclass of the first set of rules and are configured to be complementary with the first set of rules.

The authorization component 730 may receive an authorization credential associated with a log-in request. In some examples, the authorization component 730 may validate an identity of a person based on receiving the authorization credential, where generating the transaction funnel is based on the identity of the person.

The status component 735 may determine a status of the first set of rules, the status indicating whether an action associated with the first set of rules is complete or incomplete. In some examples, the status component 735 may transmit, to the representative, a notification that the determined status of the first set of rules is incomplete. In some examples, the status component 735 may receive, from the representative, an indication that the representative completed the action before providing the product or service.

The selection component 740 may receive a selection of the transaction funnel from the plurality of transaction funnels associated with a plurality of providers. In some examples, the selection component 740 may determine one or more relationships between the provider and the entity, where generating the transaction funnel is based on the one or more relationships.

Figure 8:
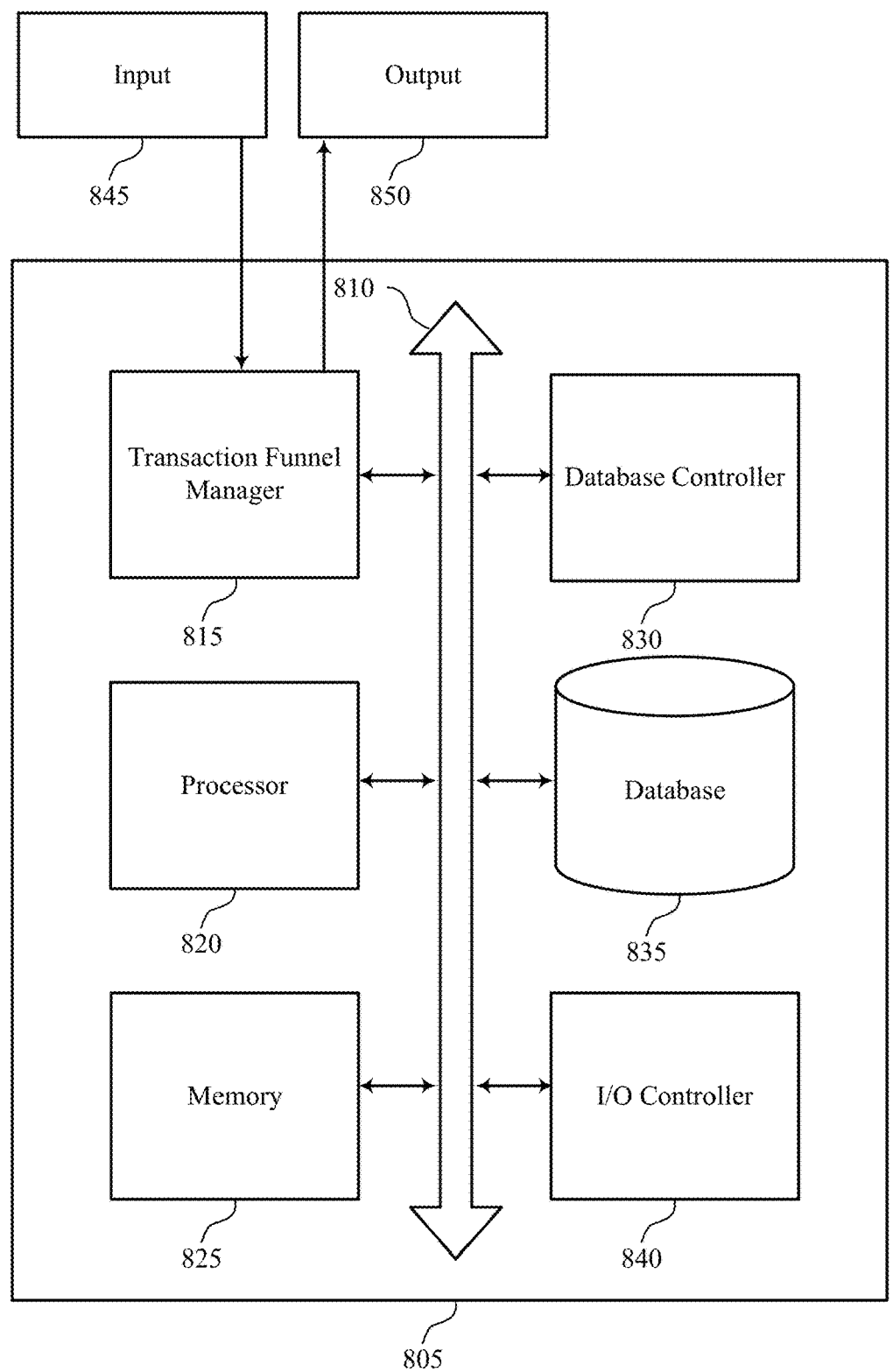
FIG. 8 illustrates a diagram of a system including a device that supports techniques for configuring a transaction funnel in accordance with aspects of the present disclosure.

FIG. 8 illustrates a diagram of a system 800 including a device 805 that supports techniques for configuring a transaction funnel in accordance with aspects of the present disclosure. The device 805 may be an example of or include the components of transaction funnel manager 705 as described herein. Device 805 may include components for bi-directional data communications including components for transmitting and receiving communications, including transaction funnel manager 815, processor 820, memory 825, database controller 830, database 835, and I/O controller 840. These components may be in electronic communication via one or more buses (e.g., bus 810).

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting application-specific session authentication).

Memory 825 may include random access memory (RAM) and read only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

Database controller 830 may manage data storage and processing in database 835. In some cases, a user may interact with database controller 830. In other cases, database controller 830 may operate automatically without user interaction. Database 835 may be an example of a single database, a distributed database, multiple distributed databases, or an emergency backup database.

I/O controller 840 may manage input and output signals for device 805. I/O controller 840 may also manage peripherals not integrated into device 805. In some cases, I/O controller 840 may represent a physical connection or port to an external peripheral. In some cases, I/O controller 840 may utilize an operating system such as iOS®, ANDROID®, MS-DOS®, MS-WINDOWS®, OS/2®, UNIX®, LINUX®, or another known operating system. In other cases, I/O controller 840 may represent or interact with a modem, a keyboard, a mouse, a touchscreen, or a similar device. In some cases, I/O controller 840 may be implemented as part of a processor. In some cases, a user may interact with device 805 via I/O controller 840 or via hardware components controlled by I/O controller 840.

Figure 9:
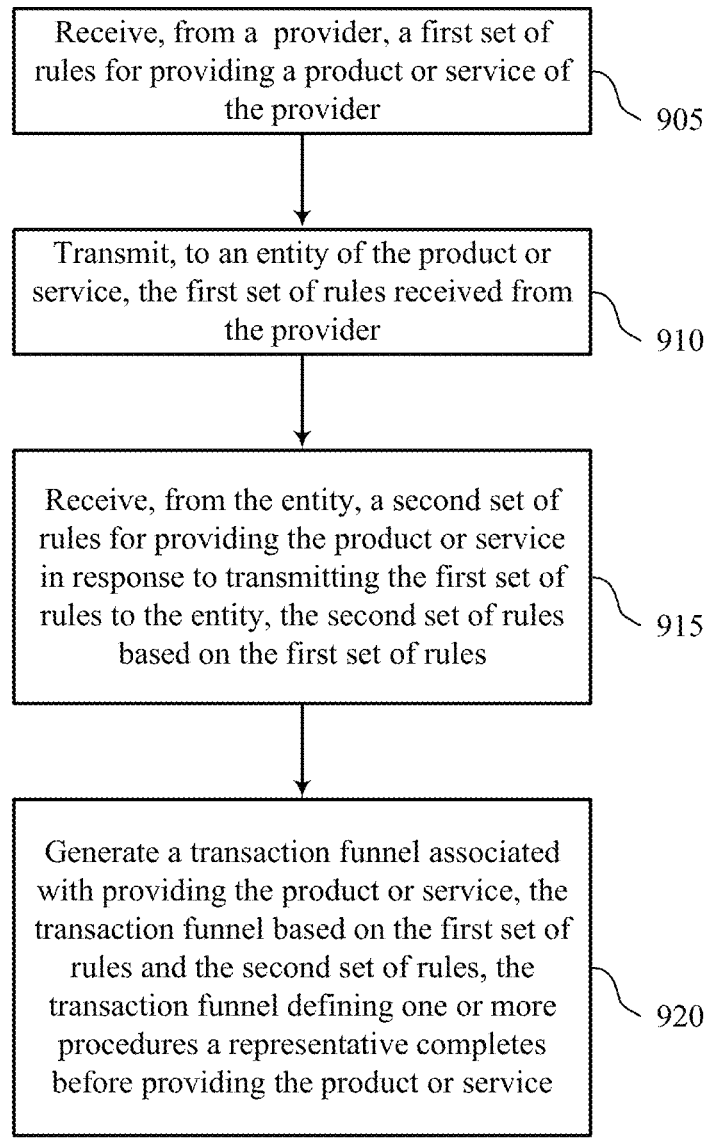
FIGS. 9 through 11 illustrate flowcharts of methods that support techniques for configuring a transaction funnel in accordance with aspects of the present disclosure.

FIG. 9 illustrate a flowchart illustrating a method 900 that supports techniques for configuring a transaction funnel in accordance with aspects of the present disclosure. The operations of method 900 may be implemented by a transaction funnel manager or its components as described herein. For example, the operations of method 900 may be performed by a default as described with reference to FIGS. 7 and 8. In some examples, a transaction funnel manager may execute a set of instructions to control the functional elements of the transaction funnel manager to perform the described functions. Additionally or alternatively, a transaction funnel manager may perform aspects of the described functions using special-purpose hardware.

At 905, the transaction funnel manager may receive, from a provider, a first set of rules for providing a product or service of the provider. The operations of 905 may be performed according to the methods described herein. In some examples, aspects of the operations of 905 may be performed by a first set of rules component as described with reference to FIGS. 7 and 8.

At 910, the transaction funnel manager may transmit, to an entity of the product or service, the first set of rules received from the provider. The operations of 910 may be performed according to the methods described herein. In some examples, aspects of the operations of 910 may be performed by a regulation component as described with reference to FIGS. 7 and 8.

At 915, the transaction funnel manager may receive, from the entity, a second set of rules for providing the product or service in response to transmitting the first set of rules to the entity, the second set of rules based on the first set of rules. The operations of 915 may be performed according to the methods described herein. In some examples, aspects of the operations of 915 may be performed by a second set of rules component as described with reference to FIGS. 7 and 8.

At 920, the transaction funnel manager may generate a transaction funnel associated with providing the product or service, the transaction funnel based on the first set of rules and the second set of rules, the transaction funnel defining one or more procedures a representative completes before providing the product or service. The operations of 920 may be performed according to the methods described herein. In some examples, aspects of the operations of 920 may be performed by a configuration component as described with reference to FIGS. 7 and 8.

Figure 10:
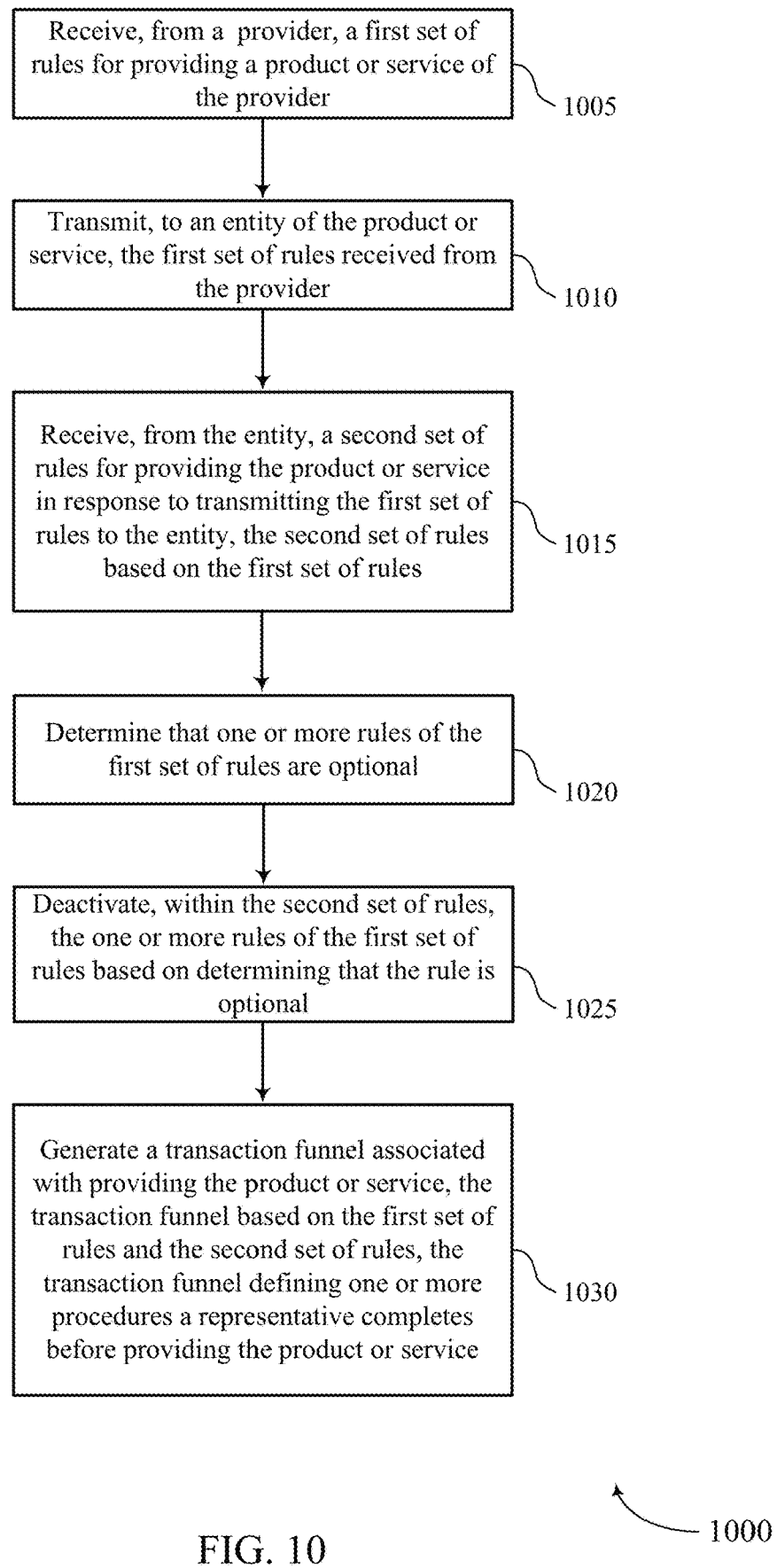

FIG. 10 illustrate a flowchart illustrating a method 1000 that supports techniques for configuring a transaction funnel in accordance with aspects of the present disclosure. The operations of method 1000 may be implemented by a transaction funnel manager or its components as described herein. For example, the operations of method 1000 may be performed by a default as described with reference to FIGS. 7 and 8. In some examples, a transaction funnel manager may execute a set of instructions to control the functional elements of the transaction funnel manager to perform the described functions. Additionally or alternatively, a transaction funnel manager may perform aspects of the described functions using special-purpose hardware.

At 1005, the transaction funnel manager may receive, from a provider, a first set of rules for providing a product or service of the provider. The operations of 1005 may be performed according to the methods described herein. In some examples, aspects of the operations of 1005 may be performed by a first set of rules component as described with reference to FIGS. 7 and 8.

At 1010, the transaction funnel manager may transmit, to an entity of the product or service, the first set of rules received from the provider. The operations of 1010 may be performed according to the methods described herein. In some examples, aspects of the operations of 1010 may be performed by a regulation component as described with reference to FIGS. 7 and 8.

At 1015, the transaction funnel manager may receive, from the entity, a second set of rules for providing the product or service in response to transmitting the first set of rules to the entity, the second set of rules based on the first set of rules. The operations of 1015 may be performed according to the methods described herein. In some examples, aspects of the operations of 1015 may be performed by a second set of rules component as described with reference to FIGS. 7 and 8.

At 1020, the transaction funnel manager may determine that one or more rules of the first set of rules are optional. The operations of 1020 may be performed according to the methods described herein. In some examples, aspects of the operations of 1020 may be performed by a regulation component as described with reference to FIGS. 7 and 8.

At 1025, the transaction funnel manager may deactivate, within the second set of rules, the one or more rules of the first set of rules based on determining that the rule is optional. The operations of 1025 may be performed according to the methods described herein. In some examples, aspects of the operations of 1025 may be performed by a regulation component as described with reference to FIGS. 7 and 8.

At 1030, the transaction funnel manager may generate a transaction funnel associated with providing the product or service, the transaction funnel based on the first set of rules and the second set of rules, the transaction funnel defining one or more procedures a representative completes before providing the product or service. The operations of 1030 may be performed according to the methods described herein. In some examples, aspects of the operations of 1020 may be performed by a configuration component as described with reference to FIGS. 7 and 8.

Figure 11:
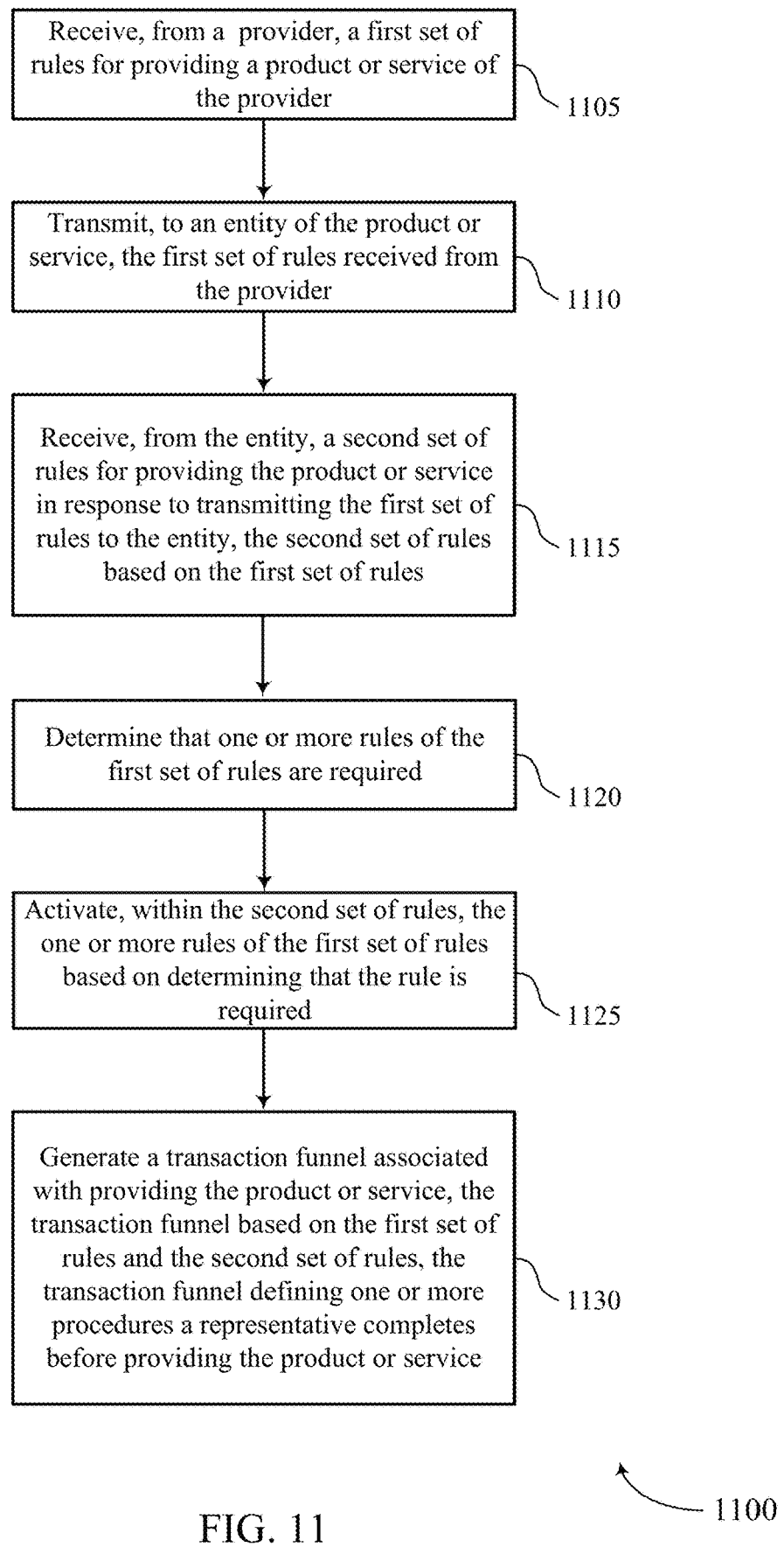

FIG. 11 illustrate a flowchart illustrating a method 1100 that supports techniques for configuring a transaction funnel in accordance with aspects of the present disclosure. The operations of method 1100 may be implemented by a transaction funnel manager or its components as described herein. For example, the operations of method 1100 may be performed by a default as described with reference to FIGS. 7 and 8. In some examples, a transaction funnel manager may execute a set of instructions to control the functional elements of the transaction funnel manager to perform the described functions. Additionally or alternatively, a transaction funnel manager may perform aspects of the described functions using special-purpose hardware.

At 1105, the transaction funnel manager may receive, from a provider, a first set of rules for providing a product or service of the provider. The operations of 1105 may be performed according to the methods described herein. In some examples, aspects of the operations of 1105 may be performed by a first set of rules component as described with reference to FIGS. 7 and 8.

At 1110, the transaction funnel manager may transmit, to an entity of the product or service, the first set of rules received from the provider. The operations of 1110 may be performed according to the methods described herein. In some examples, aspects of the operations of 1110 may be performed by a regulation component as described with reference to FIGS. 7 and 8.

At 1115, the transaction funnel manager may receive, from the entity, a second set of rules for providing the product or service in response to transmitting the first set of rules to the entity, the second set of rules based on the first set of rules. The operations of 1115 may be performed according to the methods described herein. In some examples, aspects of the operations of 1115 may be performed by a second set of rules component as described with reference to FIGS. 7 and 8.

At 1120, the transaction funnel manager may determine that one or more rules of the first set of rules are required. The operations of 1120 may be performed according to the methods described herein. In some examples, aspects of the operations of 1120 may be performed by a regulation component as described with reference to FIGS. 7 and 8.

At 1125, the transaction funnel manager may activate, within the second set of rules, the one or more rules of the first set of rules based on determining that the rule is required. The operations of 1125 may be performed according to the methods described herein. In some examples, aspects of the operations of 1125 may be performed by a regulation component as described with reference to FIGS. 7 and 8.

At 1130, the transaction funnel manager may generate a transaction funnel associated with providing the product or service, the transaction funnel based on the first set of rules and the second set of rules, the transaction funnel defining one or more procedures a representative completes before providing the product or service. The operations of 1130 may be performed according to the methods described herein. In some examples, aspects of the operations of 1120 may be performed by a configuration component as described with reference to FIGS. 7 and 8.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of data processing at a server comprising:
   receiving, from a first user device that is associated with a provider, a first set of rules for providing a product or service of the provider;
   transmitting, to a second user device and a third user device that are both associated with an entity of the product or service, the first set of rules received from the first user device;
   receiving, from the second user device, a second set of rules for providing the product or service in response to transmitting the first set of rules to the second user device;
   receiving, from the third user device, a third set of rules for providing the product or service in response to transmitting the first set of rules to the third user device, the second set of rules and the third set of rules each based at least in part on the first set of rules and each comprising at least one additional rule that activates or deactivates a rule of the first set of rules;
   generating a first transaction funnel associated with providing the product or service, the first transaction funnel comprising the first set of rules and the second set of rules;
   generating a second transaction funnel associated with providing the product or service, the second transaction funnel based at least in part on the first set of rules and the third set of rules, each transaction funnel comprising a service workflow defining one or more procedures a representative completes before providing the product or service, the service workflow implemented using an orchestration engine customized for the product or service provided, the orchestration engine comprising a computing engine configured to automate coordination and management of computer resources and services for the service workflow;
   receiving an authorization credential associated with a log-in request from the representative to validate an identity of the representative; and
   generating, in response to validating the identity of the representative, a transaction profile associated with the representative that displays the first transaction funnel and the second transaction funnel on a device of the representative, wherein the transaction profile is configured to display a plurality of transaction funnels each associated with providing a different product or service to a customer in contact with the representative, the transaction profile dynamically generated and configured based on the first and second transaction funnels, and according to the service workflow, for a customized experience for the representative.

2. The method of claim 1, wherein the second set of rules is a subclass of the first set of rules and are configured to be complementary with the first set of rules.

3. The method of claim 1, wherein the first transaction funnel comprises the first set of rules and the second set of rules.

4. The method of claim 1, wherein the first set of rules indicates whether one or more rules of the first set of rules are required or optional.

5. The method of claim 1, further comprising:
   determining that one or more rules of the first set of rules are optional; and
   deactivating, within the second set of rules, the one or more rules of the first set of rules based at least in part on determining that the one or more rules are optional.

6. The method of claim 1, further comprising:
   determining that one or more rules of the first set of rules are required; and
   activating, within the second set of rules, the one or more rules of the first set of rules based at least in part on determining that the rule is required.

7. The method of claim 1, further comprising:
   determining a status of the first set of rules, the status indicating whether an action associated with the first set of rules is complete or incomplete.

8. The method of claim 7, further comprising:
   transmitting, to the representative, a notification that the determined status of the first set of rules is incomplete; and
   receiving, from the representative, an indication that the representative completed the action before providing the product or service.

9. The method of claim 1, wherein the transaction profile includes a plurality of providers associated with the plurality of transaction funnels, wherein each of the plurality of providers comprises one of the plurality of transaction funnels.

10. The method of claim 9, further comprising:
    receiving a selection of the first transaction funnel from the plurality of transaction funnels associated with the plurality of providers.

11. The method of claim 1, further comprising:
    determining one or more relationships between the provider and the entity, wherein generating the first transaction funnel is based at least in part on the one or more relationships.

12. The method of claim 1, further comprising:
transmitting the transaction profile based at least in part on generating the transaction profile.

13. The method of claim 1, further comprising:
receiving an authorization credential associated with a log-in request; and
validating an identity of a person based at least in part on receiving the authorization credential, wherein generating the first transaction funnel is based at least in part on the identity of the person.

14. The method of claim 1, further comprising:
receiving a request associated with the product or service, wherein generating the first transaction funnel is based at least in part on receiving the request, wherein the request comprises a confirmation of an identity of a person, a confirmation of an appointment to install the product or service, a notification to pay for the product or service, a quality survey associated with the representative that provides the product or service to the person, or a combination thereof.

15. The method of claim 1, wherein the first transaction funnel comprises metadata, one or more application programming interfaces (APIs), one or more webhooks, one or more messaging platforms, or a combination thereof.

16. The method of claim 1, wherein the first set of rules comprises one or more service details, a commission structure, a service status, one or more service requirements, a service workflow, or a combination thereof.

17. An apparatus, comprising:
a processor;
a memory in electronic communication with the processor; and
instructions stored in the memory and executable by the processor to cause the apparatus to:
receive, from a first user device that is associated with a provider, a first set of rules for providing a product or service of the provider;
transmit, to a second user device and a third user device that are both associated with an entity of the product or service, the first set of rules received from the first user device;
receive, from the second user device, a second set of rules for providing the product or service in response to transmitting the first set of rules to the second user device;
receive, from the third user device, a third set of rules for providing the product or service in response to transmitting the first set of rules to the third user device, the second set of rules and the third set of rules each based at least in part on the first set of rules and each comprising at least one additional rule that activates or deactivates a rule of the first set of rules;
generate a first transaction funnel associated with providing the product or service, the first transaction funnel comprising the first set of rules and the second set of rules;
generate a second transaction funnel associated with providing the product or service, the second transaction funnel based at least in part on the first set of rules and the third set of rules, each transaction funnel comprising a service workflow defining one or more procedures a representative completes before providing the product or service, the service workflow implemented using an orchestration engine customized for the product or service provided, the orchestration engine comprising a computing engine configured to automate coordination and management of computer resources and services for the service workflow;
receive an authorization credential associated with a log-in request from the representative to validate an identity of the representative; and
generate, in response to validating the identity of the representative, a transaction profile associated with the representative that displays the first transaction funnel and the second transaction funnel on a device of the representative, wherein the transaction profile is configured to display a plurality of transaction funnels each associated with providing a different product or service to a customer in contact with the representative, the transaction profile dynamically generated and configured based on the first and second transaction funnels, and according to the service workflow, for a customized experience for the representative.

18. The apparatus of claim 17, wherein the second set of rules is a subclass of the first set of rules and are configured to be complementary with the first set of rules.

19. A non-transitory computer-readable medium storing code, the code comprising instructions executable by a processor to:
receive, from a first user device that is associated with a provider, a first set of rules for providing a product or service of the provider;
transmit, to a second user device and a third user device that are both associated with an entity of the product or service, the first set of rules received from the first user device;
receive, from the second user device, a second set of rules for providing the product or service in response to transmitting the first set of rules to the second user device;
receive, from the third user device, a third set of rules for providing the product or service in response to transmitting the first set of rules to the third user device, the second set of rules and the third set of rules each based at least in part on the first set of rules and each comprising at least one additional rule that activates or deactivates a rule of the first set of rules;
generate a first transaction funnel associated with providing the product or service, the first transaction funnel comprising the first set of rules and the second set of rules;
generate a second transaction funnel associated with providing the product or service, the second transaction funnel based at least in part on the first set of rules and the third set of rules, each transaction funnel comprising a service workflow defining one or more procedures a representative completes before providing the product or service, the service workflow implemented using an orchestration engine customized for the product or service provided, the orchestration engine comprising a computing engine configured to automate coordination and management of computer resources and services for the service workflow;
receive an authorization credential associated with a log-in request from the representative to validate an identity of the representative; and
generate, in response to validating the identity of the representative, a transaction profile associated with the representative that displays the first transaction funnel and the second transaction funnel on a device of the representative, wherein the transaction profile is configured to display a plurality of transaction funnels each associated with providing a different product or service to a customer in contact with the representative, the transaction profile dynamically generated and configured based on the first and second transaction funnels, and according to the service workflow, for a customized experience for the representative.

20. The non-transitory computer-readable medium of claim 19, wherein the second set of rules is a subclass of the first set of rules and are configured to be complementary with the first set of rules.

\* \* \* \* \*